United States Patent [19]

Irukulla et al.

[11] Patent Number: 4,724,529

[45] Date of Patent: Feb. 9, 1988

[54] METHOD AND APPARATUS FOR NUMERICAL DIVISION

[75] Inventors: Suren Irukulla, Holliston; Bimal V. Patel, Framingham, both of Mass.

[73] Assignee: Prime Computer, Inc., Natick, Mass.

[21] Appl. No.: 701,556

[22] Filed: Feb. 14, 1985

[51] Int. Cl.[4] .............................................. G06F 7/52
[52] U.S. Cl. ................................................... 364/761
[58] Field of Search ............................... 364/761–768

[56] References Cited

U.S. PATENT DOCUMENTS

| 3,234,367 | 2/1966 | Ottaway et al. | 235/156 |
| 3,828,175 | 8/1974 | Amdahl et al. | 235/164 |
| 3,917,935 | 2/1975 | Lazecki | 235/156 |
| 4,025,773 | 5/1977 | Bennett | 235/164 |
| 4,320,464 | 3/1982 | Desmonds | 364/766 |
| 4,364,115 | 12/1982 | Asai | 364/765 |
| 4,374,427 | 2/1983 | Katayama | 364/761 |

OTHER PUBLICATIONS

"A Simple Technique for Digital Division," S. K. Nandi and E. V. Krishnamurthy, *Communications of the ACM*, vol. 10, No. 5, May 1967, pp. 299–301.

"Divide Unit," J. E. Thornton, *Design of a Computer The Control Data*, Scott, Foresman and Company, pp. 101–105.

"Higher–Radix Division Using Estimates of the Divisor and Partial Remainders," D. E. Atkins, *IEEE Transactions on Computers*, Oct. 1968, pp. 925–934.

"A New Class of Digital Division Methods," J. E. Robertson, *IRE Transactions on Electronic Computers*, pp. 218–222, Sep. 1958.

"An Algorithm for Division," Antonin Svodoba, *Information Processing Machines*, No. 9, 1961, pp. 25–32.

"Compatible Hardware for Division and Square Root," George S. Taylor, article resulting from work prepared under U.S.D.O.E. Contract No. DE-ATO-S-765F00054 and NSF Grant No. MCS78-07291.

*Primary Examiner*—Gary V. Harkcom
*Assistant Examiner*—Long Thanh Nguyen
*Attorney, Agent, or Firm*—Lahive & Cockfield

[57] ABSTRACT

A method and apparatus for radix-$\beta$ non-restoring division. The division process occurs in four phases. In a first phase, the input operands are transformed to produce a divisor lying in a designated numerical range. Next, a transitional phase involves generating an initial radix-$\beta$ quotient digit from the transformed numerator. An iterative phase of the process generates successive partial remainders according to a recursive method. From the sign and a single radix-$\beta$ digit of each of these partial remainders, the process generates a radix-$\beta$ quotient digit. Further, a fourth phase, which may run concurrently with the transitional and iterative phases, involves accumulating successively generated quotient digits to produce a final quotient value.

16 Claims, 7 Drawing Figures

METHOD AND APPARATUS FOR NUMERICAL DIVISION

BACKGROUND OF THE INVENTION

This invention relates to a system for numerical division and, particularly, to a method and apparatus for non-restoring numerical division. The invention has application in the central processing unit of a high-speed digital computer.

In the course of normal operation, a digital computer performs numerous calculations including addition, subtraction, multiplication, and division. Division is, by far, the most complex of these operations, typically requiring more hardware and computational time than the other operations. The art provides a variety of division techniques, which have in common the utilization of an iterative method for quotient production. The iterative method generally involves generating a single quotient digit in each iterative cycle. Three of the prior art techniques are discussed below.

A restoring division technique is characterized by the selection of quotient digits in the range $0, 1, \ldots, (\beta-1)$; where $\beta$ is the radix of the division. Thornton, *Design of a Computer—The Control Data 6600*, (Scott, Foresman and Co., Glenview, Ill., 1970, pp. 101-105) discloses a radix-4 divider employing this division technique. The apparatus incorporates three adder/subtractor units for the simultaneous calculation of candidate divisor multiples and operates according to a method similar to that of manual, pencil-and-paper division.

A second division technique, non-restoring division, is characterized by the selection of quotient digits having the values $-(\beta-1), \ldots, -2, -1, 1, 2, \ldots, (\beta-1)$. A procedure employing a modified form of this technique is discussed by Nandi et al in "A Simple Technique for Digital Division" (Communications of the ACM, No. 10, 1967, pp. 299-301). In the quotient digit-producing iterative phase, the Nandi et al method generates successive "partial remainders," values reflecting the difference between the numerator and the multiplicative product of the denominator and the previously generated quotient digits. Within the iterative phase, a single radix-$\beta$ quotient digit is generated as a mathematical function of each partial remainder. In addition to the non-restoring quotient digit values listed above, quotient digits generated according to the Nandi et al method can have the value zero.

A variant of the non-restoring division technique is provided by SRT division, which is also characterized by the selection of quotient digits in the range $-(\beta-1), \ldots, -1, 0, 1, \ldots, (\beta-1)$. A discussion of the SRT technique is provided by Robertson, "A New Class of Digital Division Methods," IRE Transactions on Electronic Computers, vol. EC-7, pp. 218-222, Sept., 1958. The Robertson method employs an iterative process similar to that used by the Nandi et al. However, in Robertson, each quotient digit is generated by operation of a selection circuit, which incorporates a large look-up table.

Drawbacks presented by the prior division methods are numerous. In Thornton, for example, the performance increases do not offset the costs associated with the increased hardware requirements. Both Robertson and Nandi et al generate quotient digits in a manner which requires increased hardware in order to achieve conversion of individual quotient digits to a conventional, restoring form. Nandi et al, further, requires examination, in some cases, of two leading radix-$\beta$ digits of a partial remainder in order to produce a single quotient digit. Moreover, the Robertson method requires a look-up table having a size which rapidly increases as a function of increased radix. Further, this method requires a large data path length, i.e., the bitwise length of signals transferred between divider elements.

In light of the deficiences presented by the prior art division methods, an object of this invention is to provide a method and apparatus to perform digital division which is faster and which requires minimal hardware. Another object of the invention is to provide a division method and apparatus which operates in a higher radix and is thus capable of achieving rapid quotient digit generation. A further object is to provide a division system which requires minimal hardware in order to convert individual iteratively-generated quotient digits to conventional form. An object is also to avoid the utilization of an extensive look-up table and the utilization of a large data path length.

Other objects and features of this invention are evident in the illustrations and description below.

SUMMARY OF THE INVENTION

The above-mentioned and further objects are attained by this invention, which provides in one aspect a modified non-restoring division method having four basic steps, or phases. Initially, in a transformation phase, input operands, i.e., a normalized numerator and a normalized denominator, are multiplied by a transformation factor. to produce a transformed numerator and transformed denominator, whereby the transformed denominator has a value lying in a designated range. In a second, transitional phase, a first quotient digit is generated through examination of both the sign and the high-order radix-$\beta$ digit of the transformed numerator. Subsequently, in an iterative phase, successive partial remainders are generated according to an iterative relation. From the sign and the high-order radix-$\beta$ digit of each of these partial remainders, the method generates a single radix-$\beta$ quotient digit. In a fourth phase, which may run concurrently with the transitional and iterative phases, successively generated quotient digits are combined to form a final quotient.

More completely, one aspect of the invention provides a method for radix-$\beta$ non-restoring division with an operational sequence as follows. Initially, the method features inputting two digital operand-representative signals; one such signal is representative of a numerator, while the other is representative of a denominator. According to the value of this latter signal, the method generates a signal representative of a transformation factor having a value which, multiplied by the value of the denominator-representative signal, results in a product lying in a designated range. The value of this transformation factor-representative signal is then multiplied by the values of each of the operand-representative signals to produce transformed numerator-representative and transformed denominator-representative signals.

Subsequently, the division method examines the sign portion and a single, high-order radix-$\beta$ digit of the transformed numerator-representative signal to produce a signal representative of an initial radix-$\beta$ quotient digit. This signal is stored in a quotient accumulation section.

Following production of the initial quotient digit-representative signal, the iterative phase of the method executes, both repeatedly and for a selected number of times, two sub-steps. The first iterative sub-step involves generating and storing a signal representative of a partial remainder. The second iterative sub-step requires examining the sign portion and a single, high-order radix-$\beta$ digit of the partial remainder-representative signal to produce a signal representative of a quotient digit. This signal is subsequently accumulated in the quotient accumulation section along with the previously-generated quotient digit-representative signals.

In another aspect, the invention provides a method for digital division, as described above, which includes the step of calculating each partial remainder according to the relation:

$$P_{j+1} = \beta P_j - q_j D';$$

where $P_{j+1}$ denotes the new partial remainder, $P_j$ denotes, for $j=0$, the value of the transformed numerator reduced a radix-$\beta$ order of magnitude, i.e., $N'/\beta$, and, alternatively, for $j>0$, denotes the previously-generated partial remainder;

$q_j$ denotes, for $j=0$, the initial quotient digit derived from the transformed numerator and, alternatively, for $j>0$, denotes a previously-generated quotient digit; and $D'$ represents the transformed denominator.

Another aspect of the invention provides an apparatus, operating in a micro-code controlled signal processing environment, for radix-$\beta$ numerical division, including (i) an element for inputting a signal representative of a numerator, (ii) an element for inputting a signal representative of a denominator, (iii) an element for generating a signal representative of a transformation factor, (iv) an element for generating and storing a signal representative of a transformed denominator which is equivalent to a multiplicative product of the denominator-representative signal and the transformation factor-representative signal, (v) an element for generating a signal representative of a transformed numerator, (vi) an element responsive to the sign portion and a single radix-$\beta$ digit portion of the transformed numerator-representative for generating and storing a signal representative of a quotient digit, and (vii) an element for selectively and repeatedly invoking the operation of two iterative elements. The first such element generates a partial remainder-representative signal having a sign portion and a magnitude portion representative of at least one radix-$\beta$ digit. The second iterative element evaluates the sign portion of a single radix-$\beta$ digit portion of the partial remainder-representative signal and generates a signal representative of a single radix-$\beta$ quotient digit.

Another aspect of the invention contemplates an apparatus of the type described above in which each of the evaluating elements comprise: (i) an element responsive to the evaluated sign portion and single radix-$\beta$ digit-representative portion of a partial remainder-representative signal being representative of a negative value for selecting a quotient digit numerically equal to that negative value, (ii) an element responsive to the evaluated sign portion and single radix-$\beta$ digit-representative portion being representative of a positive value ($\beta-1$) for selecting a quotient digit to be numerically equal to that positive value, and (iii) an element responsive to the evaluated sign portion and single radix-$\beta$ digit-representative portion being representative of a positive value not equal to the value ($\beta-1$) for selecting a quotient digit to be numerically equal to the positive value incremented by one.

Through utilization of features provided by the invention, a divider can attain reduced execution time through higher radix iterative quotient digit generation. Moreover, the quotient digit generation method requires minimal hardware. A divider so constructed also requires less hardware for the conversion of quotient digits to conventional form. Still further, a divider constructed in accord with the invention does not require an extensive look-up table nor a large data path length.

Other aspects and features of the invention are evident in the illustrations and description below.

BASIC DESCRIPTION OF THE DRAWING

A more thorough understanding of the invention may be attained through reference to the drawing, in which.

DETAILED DESCRIPTION OF THE ILLUSTRATIONS

Figure 1:
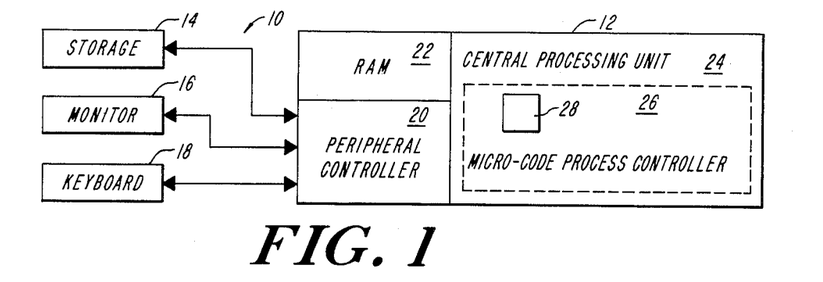
FIG. 1 illustrates a digital computer system for use in practice of the invention.

Referring to FIG. 1 a computer system 10 includes a computer 12 and peripheral devices, exemplified by a storage device 14, a monitor 16, and a keyboard 18. These peripheral devices interface with computer 12 through a peripheral controller 20. Computer 12 additionally has a random access memory element 22 and a central processing unit 24. As indicated by a dashed line, the central processing unit 24 also includes a micro-code process controller 26. The illustrated computer system 10 represents any one of numerous commercially available computer systems. The general operation of the system 10, including illustrated components 12-26, is well known in the art.

Figures 2, 3:
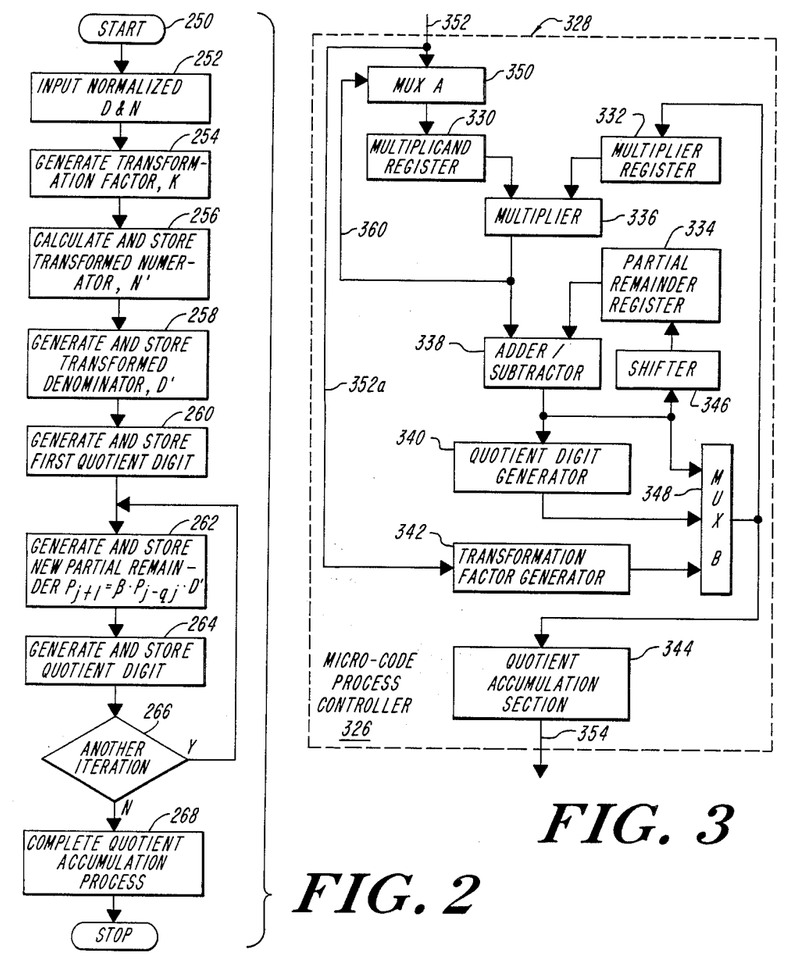
FIG. 2 illustrates the general operating sequence of a divider constructed in accord with the invention.
FIG. 3 illustrates the hardware architecture of a divider constructed in accord with one practice of the invention.

The operation of a preferred divider 28, constructed in accord with the invention and functioning under the control of the micro-code controller 26, is presented in the flow-chart of FIG. 2. Briefly, the illustrated division method is a four-phase process. Initially, in a transformation phase, the input operands are multiplied by a transformation factor to produce a transformed numerator and transformed denominator. In a second, transitional phase, an initial quotient digit is produced from the transformed numerator. Subsequently, in an iterative phase, successive partial remainder values are generated according to an iterative process and, from each of these values, the divider generates a quotient digit. In a fourth phase, which may run concurrently with the transitional and iterative phases, successively generated quotient digits are combined to form the final quotient.

Referring to FIG. 2, illustrated steps 252–258 depict the transformation phase of a preferred division process. Initially, the system inputs signals representative of the normalized operands, D and N, step 252.

As shown in step 254, the divider next generates a transformation factor-representative signal. The transformation factor, K, is determined such that the multiplicative product D*K lies within a selected range. Subsequently, in step 256, the divider calculates and stores a signal representative of the transformed numerator, N', equal to the multiplicative product N*K. Further, in step 258, the divider calculates and stores a signal representative of a transformed denominator, D', equal to the multiplicative product D*K.

Step 260 depicts the above-mentioned transitional phase in which the divider generates a first quotient digit. This quotient digit is generated from the sign-extended form of the transformed numerator-representative signal. As the sign of the initial quotient digit determines the sign of the final quotient, the sign portion of the initial quotient digit signal is stored along with magnitude portion, within the quotient accumulation section. With regard to timing, the transitional phase may transpire, at least in part, during the transformation phase. More particularly, while the transformed numerator-representative signal is being stored for subsequent use in the iterative phase, that same signal may be routed through a quotient digit generator for production of the first quotient digit.

Illustrated at steps 262–266 is the iterative phase of a preferred divider method. In step 262, the divider generates and stores a signal representative of a partial remainder, according to the known iterative equation $P_{j+1} = \beta P_j - q_j D'$, discussed above. For the initial iterative calculation, i.e., in determining $P_1$, the transformed numerator reduced a radix-$\beta$ order of magnitude is deemed the partial remainder $P_o$, while the quotient digit generated from the transformed numerator is deemed the quotient digit $q_o$. The production of this initial quotient digit is discussed in greater detail below.

As illustrated by step 264, a quotient digit is generated from each partial remainder. The quotient digit is a mathematical function of the sign of a partial remainder and the magnitude of its high-order radix-$\beta$ digit. More particularly, if the partial remainder is negative, the magnitude of the quotient digit is set equal to the magnitude of the high-order radix-$\beta$ digit of the partial remainder, while the sign of the quotient digit signal is set negative. In those instances in which the partial remainder is negative and the magnitude of the high-order radix-$\beta$ digit is equal to $\beta$, the quotient digit may be selected as having a value either equal to $-(\beta-1)$ or equal to $-\beta$. Where the partial remainder is positive and not equal to $(\beta-1)$, the quotient digit magnitude is set equal to the magnitude of the high-order radix-$\beta$ digit of the partial remainder incremented by one, while the sign bit of the quotient digit signal is set positive. Further, if the partial remainder is positive and equal to $(\beta-1)$, then the quotient digit signal magnitude portion is set equal to $(\beta-1)$, while the sign portion of that signal is set positive.

Mathematically, the quotient digit generation rules are expressed as follows:

| | |
|---|---|
| $q = P_{j,0}$ | for $P_j < 0$ |
| $q = (P_{j,0} + 1)$ | for $P_j > 0$ and $P_{j,0} \neq (\beta - 1)$ |
| $q = P_{j,0}$ | for $P_j > 0$ and $P_{j,0} = (\beta - 1)$ |

In the alternative, one embodiment employs quotient digit generation rules expressed as follows:

| | |
|---|---|
| $q = (P_{j,0} + 1)$ | for $P_j < 0$ and $P_{j,0} = -\beta$ |
| $q = P_{j,0}$ | for $P_j < 0$ and $P_{j,0} \neq -\beta$ |
| $q = (P_{j,0} + 1)$ | for $P_j > 0$ and $P_{j,0} \neq (\beta - 1)$ |
| $q = P_{j,0}$ | for $P_j > 0$ and $P_{j,0} = (\beta - 1)$ |

Within each of these expressions "q" denotes the current quotient digit, "$P_j$" denotes current partial remainder, and "$P_{j,0}$" denotes the leading radix-$\beta$ digit of the current partial remainder.

In illustrated step 266, a determination is made whether another iteration is necessary to achieve the desired precision. If so, process flow is diverted to step 262; otherwise, the process proceeds to step 268. In a preferred radix-128 divider, 8 iterations are performed to achieve a final quotient accuracy of 48 bits.

Step 268 depicts the final step of the illustrated division process. Here, the final quotient is produced from the accumulated quotient digits of the preceding steps. This process is discussed in greater detail below.

It will be understood that the illustrated timing of the numerator transformation step, step 256, is not essential to operation of the divider. Rather, the input numerator may be treated in a like manner to the treatment of the transformed numerator. This alternative produces a final quotient which, itself, requires transformation, i.e., multiplication by the transformation factor, K, prior to output.

Referring to FIG. 3, a divider 328 according to one practice the invention includes a multiplicand register 330, a multiplier register 332, a partial remainder register 334, a multiplier 336, an adder/subtractor 338, a quotient digit generator 340, a transformation factor generator 342, a quotient accumulation section 344, a shifter 346, a first multiplexor 348, and a second multiplexor 350. Operand-representative signals are input to the divider on a line 352, while a quotient-representative signal is output from the divider 328 on an output line 354. As indicated by a dashed line, operation of each element of the illustrated divider 328 is controlled by the micro-code process controller 326.

The illustrated divider 328 is designed to accept binary operand-representative signals in normalized, floating-point, two's-complement form. Still further, M bits of the magnitude portion represent either M radix-2 digits or $M/\log_2(\beta)$ radix-$\beta$ digits. High-speed operation of the divider described hereinbelow is attained, in part, through the manipulation of binary signals in their radix-$\beta$ representation, i.e. by operating on $\log_2(\beta)$ groupings of bits.

The input operand-representative signals received over lines 352, are selectively directed to the multiplicand register 330 by the multiplexor 350. In addition to its switching function, the multiplexor 350 performs a sign extension function on the operand-representative signals. The bit-wise length of extension is, as a minimum, equal to L bits; L being equal to $\log_2(\beta)$. By way of example, a radix-4 divider utilizes a sign extension length, L, of two bits, while a radix-128 divider utilizes a length, L, of seven bits. For sake of clarity, it will be further understood that following the sign extension operation, a sign bit is maintained in the sign-bit position of each of the resultant operand-representative signals and, further, that this maintained sign bit is the same as the sign bit of each of the respective input operand-representative signals.

The illustrated multiplicand register 330 serves two functions. Initially, during the transformation phase, the multiplicand register 330 stores a single operand-representative signal prior to its multiplication by the transformation factor, K. Subsequently, during the iterative step, the multiplicand register 330 stores a signal representative of the transformed denominator. As shown, the output of the multiplicand register 330 is connected to a first input of a multiplier 336.

The multiplier register 332 in the illustrated embodiment provides a second input to the multiplier 336. During operation of the illustrated divider, the multiplier register 332 serves three functions. During the transformation phase, the multiplier register 332 stores the transformation factor, K, generated by the transformation factor generator 342 and selectively directed to multiplier register 332 by multiplexor 348. Subsequently, in the transitional phase, the multiplier register 332 stores the sign-extended form of the first quotient digit generated by the adder/subtractor 338 and selectively directed to the multiplier register 332 by multiplexor 348. During the iterative phase, the multiplier register 332 stores each quotient digit signal generated by the quotient digit generator 340 and also selectively directed to the multiplier register 332 by multiplexor 348.

The multiplier 336 receives input signals from the multiplicand register 330 and the multiplier register 332. In a preferred radix-128 divider, which operates on 48-bit operands, the multiplier 336 is a two's-complement 56×8 bit multiplier, which generates a 56-bit product and operates according to the Booth algorithm. As shown in the illustration, the multiplier 336 output is connected to the multiplexor 350 and to the adder/subtractor 338.

Figure 7:
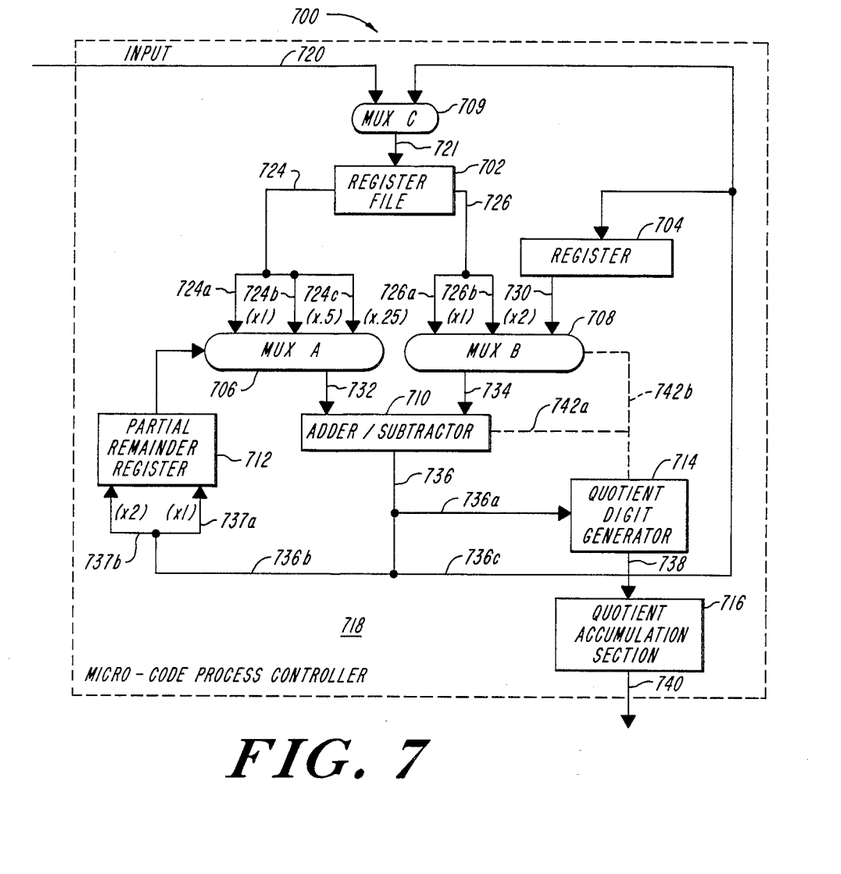
FIG. 7 illustrates a radix-4 divider constructed in accord with the invention.

The illustrated multiplier 336 can be replaced by a combination of storage registers and a multiplexor, e.g., see FIG. 7. Each storage register can be arranged to retain a multiple of the transformed denominator, whereby these multiples represent the product of the transformed denominator and each potential candidate quotient digit. The storage registers can be loaded through operation of the micro-code controller 326 prior to start of the iterative phase. During the iterative phase, the micro-code controller 326 can control the multiplexor of the above-mentioned combination so as to pass the contents of a selected storage register to the adder/subtractor 338, and the multiplexor 350.

The adder/subtractor 338 selectively adds or subtracts values represented by signals received on its two inputs—one from multiplier 336 and the other from the partial remainder register 334. In a preferred radix-128 embodiment, the adder/subtractor 338 handles a 56-bit input and output data length. As illustrated, the output from the adder/subtractor 338 is connected to the quotient digit generator 340, a shifter 346, and the multiplexor 348.

The partial remainder register 334 stores a partial remainder-representative signal generated by the adder/subtractor 338. As shown in FIG. 3, the signal received from the adder/subtractor 338 is routed through a shifter 346 prior to storage in the partial remainder register 334. The function of the shifter 346 is to left-shift the signal L bits to effect multiplication by $\beta$ of the partial remainder, as required by the equation $P_{j+1} = \beta P_j - q_j D'$. In an alternative arrangement, the partial remainder register 334 can be a shift register, incorporating the functionality of the two illustrated elements 334 and 346. Additionally, the shifter 346 and register 334 can be placed in the reverse sequence from that illustrated, resulting in signal bit-shifting subsequent to storage and prior to transmission to the adder/subtractor 338.

As with the other illustrated elements, operation of the shifter 346 is controlled by the micro-code process controller 326. During the transformation phase, for example, the controller 326 prevents execution of the shift operation by the shifter 346 or, in the alternative arrangement, by the shift-store register, in order to effect proper generation of $P_1$ according to the relation $P_{j+1} = \beta P_j - q_j D'$, discussed above. That is, for $j=0$, this relation provides $P_1 = \beta(N'/\beta) - q_0 D'$. This equation may be simplified to provide $P_1 = N' - q_0 D'$; hence, the corresponding stage of the division process is executed by inhibiting operation of the shifter during loading of the transformed numerator-representative signal into the register 334. During subsequent stages of the iterative phase of operation, the shift function is enabled.

The quotient digit generator 340 generates a signal representative of a quotient digit. As discussed in connection with FIG. 2, the quotient digit value is based on the sign and magnitude of the high order radix-$\beta$ digit of the signal received from the adder/subtractor 338. In a preferred practice, the quotient digit generator 340 selects a quotient digit having the value $-(\beta-1)$ in those instances in which the partial remainder-representative signal represents a negative value having a high order radix-$\beta$ digit of magnitude $\beta$. Hence, the quotient digit generator 340 generates quotient digit values in the range $-(\beta-1), \ldots, -1, +1, \ldots, (\beta-1)$. The quotient digit generator includes a storage register for selectively storing a newly-generated quotient digit-representative signal. This storage register is used, for example, in the transformation and transitional phases of divider operation to store the initial quotient digit during generation of the transformed denominator.

The particular portion of the partial remainder-representative signal examined by the quotient digit generator 340 for production of the initial quotient digit differs from that portion examined for production of subsequent quotient digits. That is, the location of the high-order radix-$\beta$ digit within the partial remainder-representative signal varies between the initial partial remainder, $P_o$, and the subsequent partial remainders.

Within the initial partial remainder, the high-order radix-$\beta$ digit is represented by the two bits preceding the logical radix point. As a result of the normalization and transformation, the high-order digit has a magnitude of either zero or one, regardless of the radix of division. Further, because the sign of the partial remainder is represented by a single bit, typically located in the high-order direction two bit positions from the logical radix point, the generator 340 examines only the first two bits, i.e., those bits preceeding the logical radix point, of the initial partial remainder in order to produce the initial quotient digit. A sign extension function is performed on the initial quotient digit-representative signal in order to produce a signal of the proper bit length, e.g., L bits. As a result of treating the initial quotient digit separately, the division method requires a data path length of (L−2) fewer bits.

Within the remaining partial remainder-representative signals, i.e., those representing the remainders $P_1$, $P_2$, $p_3$, etc., the high-order radix-$\beta$ digit is comprised of the L bits following the logical radix point. As above, the sign of the partial remainder is typically represented by a single bit in the sign bit position of the partial remainder-representative signal. Accordingly, the generator 340 examines the sign bit and the L bits following the logical radix point of the partial remainder-representative signal in order to generate the remaining quotient digits $q_1$, $q_2$, $q_3$, and so forth.

The quotient digit generator 340 output is connected, through the multiplexor 348, to the multiplier register 332 and to a quotient accumulation section 344.

The transformation factor generator 342 receives as its input the denominator-representative signal, over line 352a. The generator 342 produces a signal representative of a transformation factor, K, having a value which, multiplied by the value of the denominator-representative signal, produces a product within a selected range. In a preferred radix-4 divider, the absolute value of this product lies within the range between $\frac{3}{4}$ and 1. In a preferred radix-128 divider, the absolute value of this product lies between 127/128 and 1. In general, for a radix-$\beta$ divider, the absolute value of the product lies between $(\beta-1)/\beta$ and 1. Appendix I includes a table relating the value of K to the value of the input denominator for a preferred radix-128 divider. A preferred transformation factor generator 342 is disclosed in co-pending, commonly-assigned U.S. patent application, Ser. No. 701,573, for "Method and Apparatus for Effecting Range Transformation in a Digital Circuitry." The output of the transformation factor generator 342 is connected to the multiplexor 348.

The quotient accumulation section 344 stores each quotient digit received from the multiplexor 348 to produce a stored signal representative of the value N/D. The quotient accumulation section 344 is discussed in greater detail below.

Operation of the divider illustrated in FIG. 3 proceeds as follows. During an initial stage of the transformation phase, a denominator-representative signal is received on input line 352 and routed to the transformation factor generator 342. The generator 342 produces a transformation factor-representative signal which is routed to the multiplier register 332 through multiplexor 348. A numerator-representative signal is then received on input line 352, circuited through multiplexor 350, and stored in the multiplicand register 330. Subsequently, the numerator-representative signal and the transformation factor-representative signal, stored in the registers 330 and 332, respectively, are routed through the multiplier 336 to produce a transformed numerator-representative signal. This signal is subsequently routed to the partial remainder register 334, via the adder/subtractor 338 and the shifter 346. During this state of the transformation phase, operation of the adder/subtractor and the shifter are inhibited.

Following generation of the transformed numerator-representative signal, a denominator-representative signal, received on input line 352, is routed through multiplexor 350 and stored in multiplicand register 330. The denominator-representative signal and the transformation factor-representative signal, stored in registers 330 and 332, respectively, are multiplied by the multiplier 336. The resultant transformed denominator-representative signal is then routed along feedback line 360, through multiplexor 350, and stored in multiplicand register 330.

The transitional phase of operation of the illustrated divider also transpires after production of the transformed numerator-representative signal. Subsequent to routing through the adder/subtractor 338, the transformed numerator-representative signal is routed to the quotient digit generator 340. The generator 340 produces an initial quotient digit-representative signal in the manner discussed above which is stored in the quotient accumulation section 344, via the multiplexor 348. Further, the quotient digit-representative signal is retained in the generator 340 for loading into the multiplier register 332 subsequent to generation of the transformed denominator-representative signal.

Following generation of the transformed numerator-representative signal, the transformed denominator-representative signal, and the initial quotient digit-representative signal, the illustrated divider enters the iterative phase of operation. Initially, a multiplicative product of a recently generated quotient digit and the transformed denominator is produced by operation of the multiplier 336. More particularly, the transformed denominator-representative signal, stored in multiplicand register 330, and a quotient digit-representative signal, stored in register 332, are routed to the multiplier 336. Operation of the multiplier produces a signal representative of the mathematical relation $q_j*D'$, which signal is routed to the adder/subtractor 338.

Concurrent with the generation of the above-mentioned multiplicative product-representative signal, the signal stored in the partial remainder register 334, representing the term $\beta*P_j$, is routed to the adder/subtractor 338.

Subsequently, operation of the adder/subtractor 338 results in the production of a signal representative of a numerical difference of the terms $\beta*P_j$ and $q_j*D'$, i.e., the new partial remainder $P_{j+1}$ in accord with the above-mentioned relation, $P_{j+1}=\beta P_j-q_j D'$. This new partial remainder-representative signal is routed to the quotient digit generator 340 and to the shifter 346.

The action of the quotient digit generator 340 on the new partial remainder-representative signal results in the generation of a new quotient digit-representative signal in the manner discussed above. This signal is routed through the multiplexor 348 for storage in the multiplier register 332 and in the quotient accumulation section 344.

Moreover, the new partial remainder-representative signal is routed to the shifter 346 which shifts the signal L bits in the high-order direction. This shifted signal is stored in the partial remainder register 344, being representative of the multiplicative product $\beta*P_j$, for use in the next iterative cycle.

In the manner described in the preceeding paragraphs, each iterative cycle of the illustrated divider produces a single radix-$\beta$ quotient digit-representative signal, which is stored both in the multiplier register 332 for use in a subsequent cycle and in the quotient accumulation section 344 for eventual production of a quotient-representative signal. This later function, i.e., production of a quotient-representative signal, is accomplished by the quotient accumulation section 344. The function involves converting each quotient digit from its modified non-restoring form, i.e., in the numerical range $-(\beta-1), \ldots, -1, +1, \ldots, (\beta-1)$, to its conventional, restoring form, i.e., in the numerical range 0, 1, .

..., $(\beta-1)$. Each quotient digit converted in this manner can be sequentially stored in a quotient register.

The quotient accumulation section 334 can convert and store quotient digit-representative-signals by one of two known methods. The first method is utilized in the quotient accumulation section 444 shown in FIG. 4. The illustrated quotient accumulation section 444 includes a first quotient digit register 460, a second quotient digit register 462, a decrementer 464, a sense element 466, and a quotient accumulation register 468. As indicated by the dashed line, the operation of the quotient accumulation section 444 is controlled by microcode process controller 426.

Figure 4:
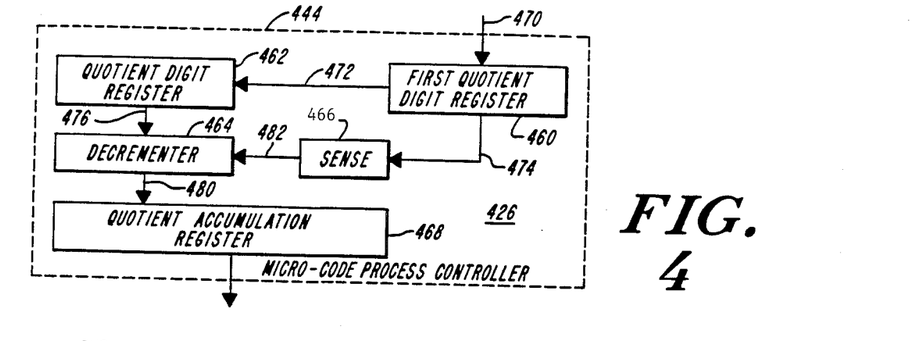
FIG. 4 illustrates a first quotient accumulation section hardware architecture.

With regard to circuit connections, quotient digit-representative signal are received by the quotient accumulation section 444 along an input line 470, which connects with the first quotient digit register 460. In turn, the first quotient digit register 460 is connected with the second quotient digit register by a line 472 and, further, is connected to the sense element 466 by a line 474. The second quotient digit register 462 is connected with the decrementer 464 by a line 476, while the quotient accumulation register 468 is connected with the decrementer 464 by a line 480.

In operation, an initial quotient digit-representative signal is received on input line 470 and stored in the first quotient digit register 460. Under control of the microcode process controller 426, the sign of the initial quotient digit-representative signal is stored in the sign portion of the quotient accumulation register 468. The magnitude portion of the quotient digit-representative signal is otherwise retained in the first register 460 until receipt of a subsequent quotient digit-representative signal.

Upon receiving each subsequently-generated quotient digit-representative signal, the quotient digit-representative signal stored in the first quotient digit register 460 is transferred to the second quotient digit register 462. From there, the quotient digit-representative signal is routed through the decrementer 464 for possible conversion and stored in the quotient accumulation register 468.

Operation of the decrementer 464 is based upon the sign of each newly-received quotient digit-representative signal, stored in the first quotient digit register 460. More particularly, if a newly-received signal is representative of a negative quotient digit, as detected by the sense element 466, the prior quotient digit-representative signal is decremented by one. On the other hand, if the newly-received quotient digit-representative signal represents a positive digit, the decrementor 464 takes no action and, thus, the magnitude of the signal is not effected.

Under control of the micro-code process controller 426, the contents of the quotient accumulation register 468 are shifted L bits prior to storage of each quotient digit-representative signal received from the second quotient digit register 462 via the decrementer 464. This shifting action both preserves the prior contents of the register and effects a radix-$\beta$ of magnitude increase in the value of register contents.

In the manner described above, successively generated quotient digit-representative signal are converted from their non-restoring form to their restoring form and stored to form a final quotient. An advantage of the method is that it requires minimal hardware. Aside from the quotient accumulation register 468, the storage areas required by the method, e.g., the first quotient digit register 460 and the second quotient digit register 462, need only accomodate the magnitude portion of each quotient digit-representative signal. As a consequence of the limited numerical range of quotient digits received from the divider, i.e., $-(\beta-1), \ldots, -1, +1, \ldots, +(\beta-1)$, a negative quotient digit can affect, at most, one prior quotient digit. This feature of limited quotient digit decrement propagation results from the absence of a positive zero-valued quotient digit.

Figures 5, 6:
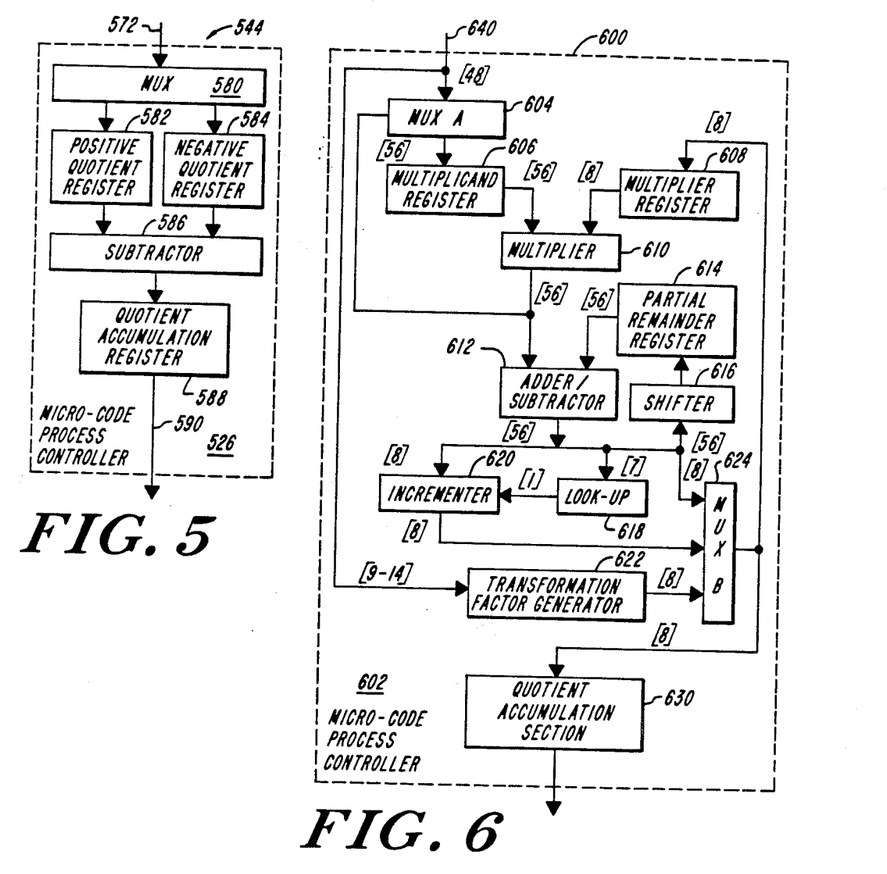
FIG. 5 illustrates a second quotient accumulation hardware architecture.
FIG. 6 illustrates the architecture of a practice of the invention and incorporates data path length denotations.

An alternative method for producing a final quotient from successively-generated quotient digit-representative signals is accomplished by the quotient accumulation section illustrated in FIG. 5. In this embodiment, a quotient accumulation section 544 comprises a multiplexor 580, a positive quotient digit register 582, a negative quotient digit register 584, a subtractor 586, and a final quotient accumulator 588. Newly-generated quotient digit-representative signals are received on a line 572, which is connected to the multiplexor 580. The multiplexor 580 has dual outputs: one output is connected with the positive quotient digit register 582, while the other output is connected with the negative quotient digit register 584. In turn, each of the quotient digit registers 582 and 584, are connected to a subtractor 586. The subtractor 586 output is connected to the quotient accumulation section 588.

As above, the general function of the quotient accumulation section 544 is to convert the quotient digit-representative signal in their non-restoring form to a restoring form for storage in the final quotient accumulation register 588. This operation is effected by storing each positive digit quotient digit-representative signal in the positive quotient digit register 582 and storing the $\beta$-complement magnitude portion of each negative quotient digit-representative signal in the negative quotient digit register 584. Simultaneous to the storage a quotient digit-representative value in either of these registers, a zero value-representative signal is stored in the other register.

Subsequent to receipt of all of the quotient digit-representative signals generated by the divider in conjunction with which the quotient accumulation section 544 operates, the values stored in each of the positive and negative quotient registers 582 and 584, respectively, are subtracted, and the result, which is representative of the quotient N/D, is placed in the quotient accumulation register 588.

FIG. 6 illustrates a particular embodiment of a divider constructed in accord with the invention and which has an architecture similar to that of the divider presented in FIG. 3. The illustration of FIG. 6 includes, in addition to a more detailed view of the quotient digit generator, notations indicating the bit-wise composition of the signals transferred between the divider elements, i.e., notations relating to the inter-elemental data paths lengths.

The illustrated divider 600 operates under the control of micro-processor controller 602, indicated by a dashed line, and includes a first multiplexor 604, a multiplicand register 606, a multiplier register 608, a multiplier 610, an adder/subtractor 612, a partial remainder register 614, a shifter 616, a look-up element 618, an incrementer 620, a transformation factor generator 622, a second multiplexor 624, and a quotient accumulation section 630.

The general operation of the divider 600 and the interconnection of the divider elements, i.e., elements 602–630, are similar to that of the divider 300 presented in FIG. 3. With further regard to the illustrated divider architecture, the divider 600 of FIG. 6 includes a more detailed quotient digit generating section, i.e., elements 618 and 620.

In addition to connection with the shifter 616, the adder/subtractor 612 is connected to both the incrementer 620 and the look-up element 618. Further, the output of the look-up element 618 is routed to the incrementer 620, while the output of the incrementer 620 is routed to the second multiplexor 624.

In operation, a portion of the signal output by the adder/subtractor 612 is routed to the incrementer 620 and to the look-up element 618. More particularly, that portion of the output signal which represents the sign and the leading radix-$\beta$ digit are routed to the elements 618, 620. In accord with the discussion above, when the signal received by the look-up element 618 is indicative of a positive partial remainder having a leading, high-order radix-$\beta$ digit not equal to $(\beta-1)$, the look-up element 618 outputs an increment signal to the incrementer 620. Upon receiving an increment signal, the incrementer 620 increments by one the value of the signal received from the adder/subtractor 612 representing the leading radix-$\beta$ digit of the partial remainder represented by the signal. On the other hand, if an increment signal is not received by the incrementer 620, that element takes no action with respect to the signal received from the adder/subtractor 612. As discussed above, the incrementor 620 can include a storage register for temporarily storing each newly generated quotient digit-representative signal.

FIG. 6 reveals with particularity the bit lengths of the signals transferred between the elements of the divider 600. These lengths are denoted adjacent to each elemental interconnection and are enclosed in square brackets. For example, with reference to the interconnection of the multiplexor 604 with the multiplicand register 606, the notation "[56]" indicates that a digital signal comprising 56 bits is passed over the adjoining line.

More particularly, the numerical values included in the bracketed bit length relate to actual bit lengths, for the illustrated radix-128, 48-bit divider as follows. The number of bits in the numerator and denominator, input over lines 640, equal 48. The number of bits at the output of the multiplier 604 equal 56. The number of bits at the output of the multplier 610 is 56 bits. The number of bits at the output of the multiplicand register 606 is equal to 56. The number of bits at the output of the multiplier register 608 is equal to 8. The number of bits at the output of the partial remainder register 614 is 56. The number of bits at the output of the adder/subtractor 612 is equal to 56. The number of bits at the input of the transformation factor generator 622 has a maximum value equal to 14 (see above-mentioned, co-pending application U.S. Ser. No. 701,573, for "Method and Apparatus for Effecting Range Transformation in a Digital Circuitry"), while the number of bits output by the generator 622 is equal to 8. The number of bits at the input to the lookup element 618 is equal to 7, while the number of bits at the output is equal to 1. The number of bits at each of the input and the output of the incrementer 620 is equal to 8. The number of bits at each of the inputs of the multiplexor 624 is equal to 8; the number of bits at the output is also equal to 8.

FIG. 7 depicts a radix-4 divider constructed in accord with the invention. The divider 700 includes a register file 702, a register 704, a first multiplexor 706, a second multiplexor 708, a third multiplexor 709, an adder/subtractor 710, a partial remainder register 712, a quotient digit generator 714, and a quotient accumulation section 716. As indicated by a dashed line, the illustrated divider 700 operates under the control of a micro-code process controller 718.

Two main features of the radix-4 divider are evident in the illustration and in the description below. Firstly, the divider 700 does not incorporate a transformation factor look-up table. Rather, the input operand-representative signals are transformed according to a shift-and-add algorithm. Secondly, the divider 700 utilizes a simple bit-shift multiplexor and a register, which stores the value 3*D', in place of a multiplier unit. These features provide efficient divider operation and reduced hardware expense. In consequence of these features, the divider 700 compares extremely favorably with other two-bit (radix-4) dividers and division methods (e.g., Thornton, supra, Robertson, supra, Atkins, "Higher-Radix Division Using Estimates of the Divisor and Partial Remainders," IEEE Transactions on Computers, October, 1968).

Operand-representative signals are input to the divider 700 on line 720, which is connected with the register file section 702 via the multiplexor 709 and lead 721. A first output of the register file section is indicated by line 724, while a second output of the register file section is indicated by line 726.

Output line 724 provides three inputs 724a, 724b, 724c to the first multiplexor 706. The input line 724b is connected with a multiplexor port which performs a single bit right-shift on an input signal. The input line 724c is connected with a multiplexor port which performs a two bit right-shift on an input signal. The input line 724a is connected with a conventional multiplexor port, which does not bit-shift the input signal. A further input to the first multiplexor 706 is provided by line 728, an output of the partial remainder register 712.

Output line 726 provides two inputs 726a, 726b to the second multiplexor 708. Line 726b is connected with a multiplexor port which performs a single bit left-shift on an input signal. Line 726a is connected with a conventional multiplexor port, which does not bit-shift the input signal. A further input to the second multiplexor 708 is provided by line 730, an output of the register 704.

An output of the first multiplexor 706, line 732, provides a first input to the adder/subtractor 710, while an output of the second multiplexor 708, line 734, provides a second input to the adder/subtractor 710.

The output of the adder/subtractor, line 736, is directed to the quotient digit generator 714, along line 736a; to the partial remainder register 712, along line 736b; and, to the registers 702, 704, along line 736c. The line 736b provides two inputs 737a, 737b to the partial remainder register 712. The line 737b is connected with an input port of the register 712 which performs a single bit left-shift on an input signal. The line 737a is connected with a conventional input port, which does not bit-shift the input signal.

An output of the quotient digit generator 714, line 738, provides an input to the quotient accumulation section 716. In turn, an output of the quotient accumulation section is indicated by line 740. The quotient digit generator 714 also provides control signals to the adder/subtractor 710 and the multiplexor 708 along lines 742a and 742b, respectively.

The divider 700 operates in a manner similar to that of the dividers illustrated in FIGS. 3 and 6. As mentioned above, however, the divider 700 requires fewer hardware elements and relies instead upon the microcode process controller 718 to direct operand transformation and transformed-denominator multiplication.

Divider operation commences upon the loading of operand-representative signals into the register file 702. In particular, a numerator-representative signal, received along line 720, is stored for output along both leads 724 and 726. Similarly, a denominator-representative signal, received along line 720, is stored for output along leads 724 and 726. The input signals are in normalized, floating-point, two's-complement form.

The transformation phase of divider operation is effected by routing the operand-representative signals through one or both register file outputs 724, 726, through the respective multiplexors 706, 708, and through the adder/subtractor 710. The transformation of each operand-representative signal is carried out under the control of the micro-code process controller 718, which tests the denominator-representative signal in order to determine the circuit configuration necessary to effect transformation.

The transformation phase is readily understood in light of the numerical range transformation effected by the divider 700. In their input, normalized form, the operand-representative signals lie either in the range greater than or equal to one-half and less than one or in the range greater than or equal to negative one and less than negative one-half. Subsequent to transformation, the operands have an absolute value in the numerical range between three-quarters and one, inclusive. To effect this range transformation, the divider 700 relies upon a transformation factor, K, having a value of 1, 1.25, or 1.5.

The specific transformation factor ultilized for the divide operation is determined by testing the sign and three magnitude bits of the denominator-representative signal stored in the register file 702. Where the denominator-representative signal is representative of a positive value having a bit pattern following the logical radix point of "100," or is representative of the negative value having a bit pattern following the logical radix point of "011," the transformation factor is determined as being equal to 1.5. Where the denominator-representative signal is representative of a positive value having a bit pattern following the logical radix point of "101," or representative of a negative value having a bit pattern following the logical radix point of "010," the transformation factor is determined as being equal to 1.25. Otherwise, the transformation factor K is determined as being equal to one.

With regard to numerator transformation, where the transformation factor is determined as being equal to 1.25, the numerator-representative signal is routed through line 724c to the corresponding input port of the first multiplexor, producing a signal representative of the value 0.25*N, i.e., the numerator-representative signal right-shifted two-bits. Concurrently, the numerator-representative signal is routed to the second multiplexor input port corresponding with line 726a. Subsequently, the adder/subtractor 710 operates on the signals output by the multiplexors 706, 708, producing a signal representative of the transformed numerator, N', having a value equal to the multiplicative product 1.25*N.

Where the transformation factor is determined as being equal to 1.5, the transformed numerator-representative signal is generated in a manner similar to that described in the proceeding paragraph. However, in this instance, the numerator-representative signal is routed through the multiplexor port corresponding with line 724b, resulting in a first multiplexor output signal having a value equal to 0.5*N.

In the event the transformation factor is determined as being equal to one, generation of the transformed numerator-representative signal is simpler. In this instance, the numerator-representative signal is merely routed through the multiplexor port corresponding with the line 724a, and through the adder/subtractor 710. These elements take no action with respect to the signal, thereby producing a transformed numerator-representative signal at the adder/subtractor output line 736 having a value equal to the input numerator-representative signal.

In each of the above-mention instances, the transformed numerator-representative signal is routed from the adder/subtractor output to the partial remainder register 712. The signal is input to the register 712 via the port corresponding with line 737a. Concurrently the transformed numerator-representative signal is routed to the quotient digit generator 714. The generator 714 produces an initial quotient digit-representative signal in the manner discussed above. In those instances where the partial remainder-representative signal represents a negative value having a high-order radix-$\beta$ digit of magnitude $\beta$, the generator 714 selects a quotient digit having the value $-3$. Hence, the quotient digit generator 714 produces quotient digits having any one of the values $-3, -2, -1, 1, 2, 3$. The quotient digit-representative signal is routed to the quotient accumulation section 716 and is retained in the quotient digit generator 714 for subsequent use in the iterative phase of operation.

The transformed denominator-representative signal is generated in a manner similar to that of the transformed numerator-representative signal. The transformed denominator-representative signal is routed from the adder/subtractor output line 736 to the register file 70.

Prior to completion of the transformation phase, the divider executes an additional cycle to generate a signal representative of the multiplicative product 3*D'. During this cycle, a transformed denominator-representative signal is routed to the multiplexor 706 via the port corresponding to line 724a. Concurrently, a transformed denominator-representative signal is routed to the multiplexor 708 via the port corresponding to line 726b. The signals output by the first and second multiplexors 706, 708 are routed to the adder/subtractor 710, which acts on the signals to produce a signal representative of the value 3*D'. This signal is routed along line 736c for storage in the register 704.

In a preferred embodiment, the transformation of the denominator-representative signal transpires prior to the transformation of the numerator-representative signal.

Following the generation of the transformed numerator-representative signal, the transformed denominator-representative signal, and the initial quotient digit, the divider 700 enters the iterative phase of operation, characterized by the execution of the above-mentioned equation $P_{j+1}=\beta P_j-q_jD'$. A signal representative of the first term of the right-hand side of this equation is supplied to the adder/subtractor 710 from the partial remainder register 712, via the first multiplexor 706. The signal representative of the second term of the right-hand side of the equation is supplied to the adder/- subtractor 710 from the registers 702, 704. Action of the control signal applied along control line 742b determines the specific register and multiplexor port of the transformed denominator-representative signal. More particularly, where the previously-generated quotient digit has a magnitude equal to one, the denominator-representative signal is input to the multiplexor along the port corresponding with the line 726a. Where the previously-generated quotient digit has a magnitude equal to two, the transformed denominator-representative signal is input along the port corresponding with the line 726b. Further, where the previously-generated quotient digit has a magnitude equal to three, the transformed denominator-representative signal is input on the line 730.

Operation of the adder/subtractor 710 on the signals received along lines 732 and 734 is determined by the sign control signal provided along control line 742a. More particularly, if the previously-generated quotient digit is positive, the control signal causes the adder/subtractor 710 to perform a subtraction. Where, on the other hand, the previously-generated quotient digit is negative, the control signal causes the adder/subtractor to perform an addition. As a consequence of adder/subtractor 710 operation, a signal is produced on output line 736, and is representative of the new partial remainder, $P_{j+1}$. This signal is applied to the quotient digit generator 714 and to the partial remainder register 712, via the port corresponding with the line 737b.

The quotient digit generator 714 operates on the newly-received signal to produce quotient digit-representative signal. This signal is stored within the quotient digit generator for effecting control of the next iterative stage and is routed to the quotient accumulation section 716. Further, the partial remainder-representative signal is routed to the partial remainder register 712, via line 737b, for use in the next iterative cycle.

In the manner described in the preceding paragraphs the illustrated divider 700 performs numerous iterative cycles, each of which results in the generation of a single radix-$\beta$ quotient digit-representative signal. As discussed in conjuncton with FIGS. 4 and 5, these signals are accumulated in the quotient accumulation section 716, to permit subsequent production of a quotient-representative signal.

EXAMPLE

The division process utilized by a divider constructed in accord with the invention is shown in the following example in which $\beta = 10$ and in which all values, including the input operands, are in radix-10 complement form. In this example, the numerator 0.9999695 is divided by the denominator 0.5.

N = 0.9999695
D = 0.5
N/D = 0.9999695/0.5

A transformation factor, K, is selected to provide a transformed denominator having a value between 0.9 and 1.0, non-inclusive.

K = 1.9

Accordingly,

D' = D * K = 0.95
N' = N * K = 1.8999421

The initial partial remainder is set equal to transformed numerator.

$P_o = N' = 01.8999421$; where the initial '0' represents the sign bit.

The initial quotient digit is determined according to the rules discussed above.

$q_0 = 1 + 1 = 2$

Subsequently, successive partial remainders and quotient digits are generated in the iterative phase, represented by the table below. Each row of the table represents a step of the iterative phase as indicated by the comment adjacent to the row. Each column of the table represents a bit or bit grouping from a value-representative signal, e.g., a partial remainder. The first column represents the sign bit, while the remaining columns represent the magnitude portion.

A "9" in the first column, i.e., the sign bit position, represents a negative value. The decimal points separating columns two and three represent the logical radix point. The underlined digits of the rows representing partial remainders indicate a sign-representative bit and high-order radix-$\beta$ digit examined for determining the quotient digit associated with the partial remainder. Further, a subscripted lower case "q" represents a quotient digit, while a like-subscripted uppercase "Q," represents the $\beta$-complement form of the quotient digit. For example, for the quotient digit $q_1$, the $\beta$-complement form is indicated by the symbol "$Q_1$".

---

$0\underline{1}.8999421$; $P_0$; $q_0 = 1 + 1 = 2$
$01.9000000$; $q_0 * D'$
$9\underline{9}.9999421$; $P_1 = P_0 - q_0D'$; $q_1 = -9$; $Q_1 = 1$
$99.9994210$; $\beta * P_1$
$00.9500000$; $Q_1 * D'$
$0\underline{0}.9494210$; $P_2 = \beta P_1 + Q_1D'$; $q_2 = 9$
$09.4942100$; $\beta * P_2$
$08.5500000$; $q_2 * D'$
$0\underline{0}.9442100$; $P_3 = \beta P_2 - q_2D'$; $q_3 = 9$
$09.4421000$; $\beta * P_3$
$08.5500000$; $q_3 * D'$
$0\underline{0}.8921000$; $P_4 = \beta P_3 - q_3D'$; $q_4 = 8 + 1 = 9$
$08.9210000$; $\beta * P_4$
$08.5500000$; $q_4 * D'$
$0\underline{0}.3710000$; $P_5 = \beta P_4 - q_4D'$; $q_5 = 3 + 1 = 4$
$03.7100000$; $\beta * P_5$
$03.8000000$; $q_5 * D'$
$9\underline{9}.9100000$; $P_6 = \beta P_5 - q_5D'$; $q_6 = -9$; $Q_6 = 1$
$99.1000000$; $\beta * P_6$
$00.9500000$; $Q_6 * D'$
$0\underline{0}.0500000$; $P_7 = \beta P_6 + Q_6D'$; $q_7 = 1$
$00.5000000$; $\beta * P_7$

---

As shown in the table, above, the non-restoring quotient digits generated by the method according to the invention are, in the order generated, 2, −9, 9, 9, 9, 4, −9, and 1

These quotient digits are converted to conventional form by the above-mentioned first quotient conversion method as follows

---

2 − 1 = 1; subsequent quotient digit is negative
−9 − (sign bit) = 9; drop sign bit
9 = 9; (unaffected)
9 = 9; (unaffected)
9 = 9; (unaffected)
4 − 1 = 3; subsequent quotient digit is negative
−9 − (sign bit) = 9; drop sign bit
1 = 1; (unaffected)

---

The final quotient according to the first method is in agreement with the theoretical quotient value and is 1.999939

The generated quotient digits can also be converted to conventional form by application of the second quotient conversion method. Here, the positive and negative quotient registers retain the individual quotient digit-representative signals as follows 2.0999401; positive register
0.1000010; negative register The difference between the two storage registers represents the final quotient, which is also in agreement with the theoretical quotient value

|                |
| -------------- |
| 2.0999401      |
| − 0.1000010    |
| 1.9999391      |

While the above example is shown using $\beta$-complement arithmetic, it will be understood that the method is also applicable using conventional arithmetic.

The preceding discussion outlines the architecture and method of operation of a divider according to the invention. It will be understood by those practiced in the art that additions, subtractions, deletions, and other variations upon the hardware architecture and operating sequence described above are within the scope of the following claims.

APPENDIX I
Radix-128 Divider - Transformation Factor Table

| Range of Divisor (D*512) (in Decimal, i.e., radix-10, form) | Transformation Factor, (K*128) |
| --- | --- |
| 256 | 255 |
| 257 | 254 |
| 258–270 | 253–241, respectively |
| 271–272 | 240 |
| 273 | 239 |
| 274–283 | 238–230, respectively |
| 284–285 | 229 |
| 286–495 | 228–132, respectively |
| 496–499 | 131 |
| 500–503 | 130 |
| 504–507 | 129 |
| 508–511 | 128 |

What is claimed is:

1. A method for radix-$\beta$ numerical division, comprising the steps of:
   A. inputting a signal representative of a numerator, N;
   B. inputting a signal representative of a denominator, D;
   C. generating a signal representative of a transformation factor, K;
   D. generating and storing a signal representative of a transformed denominator, D', in a range $(\beta-1)/\beta$ to 1, and being equal to a multiplicative product D*K;
   E. generating a signal representative of a transformed numerator, N', said transformed numerator-representative signal having a sign portion and a magnitude portion representative of at least one radix-$\beta$ digit;
   F. evaluating the sign portion and a single radix-$\beta$ digit-representative portion of said transformed numerator-representative signal for generating and storing a signal representative of a quotient digit, q; and
   G. repeating a selected number of times the steps of:
      i. generating a signal representative of a partial remainder, P, said partial remainder-representative signal having a sign portion and a magnitude portion representative of at least one radix-$\beta$ digit, and
      ii. evaluating the sign portion and a single radix-$\beta$ digit representative portion of said partial remainder-representative signal for generating and storing a signal representative of a quotient digit, q.

2. The method of claim 1 wherein said transformed numerator-representative signal generating step further comprises the step of selecting the transformed numerator, N', to be numerically equal to a multiplicative product N*K.

3. The method of claim 1 wherein said transformed numerator-representative signal generating step further comprises the step of selecting the transformed numerator, N', to be numerically equal to the numerator, N.

4. The method of claim 1 wherein each said evaluating step further comprises the steps of:
   i. responding to evaluated portions of said transformed numerator representative signal being representative of a negative value for selecting said quotient digit, q, to be numerically equal to the value represented by said evaluated portions,
   ii. responding to evaluated portions of said transformed numerator representative signal being representative of a positive value $(\beta-1)$ for selecting said quotient digit, q, to be numerically equal to the value represented by said evaluated portions, and
   iii. responding to evaluated portions of said transformed numerator representative signal being representative of a positive value not equal to a positive value $(\beta-1)$ for selecting said quotient digit, q, to be numerically equal to the value represented by said evaluated portions incremented by one.

5. The method of claim 1 wherein each said evaluating step further comprises the steps of:
   i. responding to evaluated portions of said transformed numerator representative signal being representative of a negative value not equal to a value $-\beta$ for selecting said quotient digit, q, to be numerically equal to the value represented by said evaluated portions,
   ii. responding to evaluated portions of said transformed numerator representative signal being representative of a negative value equal to a value $-\beta$ for selecting said quotient digit, q, to be representative of the value $-(\beta-1)$,
   iii. responding to evaluated portions of said transformed numerator representative signal being representaitve of a positive value $(\beta-1)$ for selecting said quotient digit, q, to be numerically equal to the value represented by said evaluated portions, and
   iv. responding to evaluated portions of said transformed numerator representative signal being representative of a positive value not equal to a positive value $(\beta-1)$ for selecting said quotient digit, q, to be numerically equal to the value represented by said evaluated portions incremented by one.

6. The method of claim 1 wherein said partial remainder-representative signal generating step further comprises the step of selecting a partial remainder according to the expression $$P_{j+1} = \beta P_j - q_j D'$$

where
   $P_{j+1}$ denotes a partial remainder being currently selected,

β denotes the radix of the division, $P_j$ denotes a transformed numerator reduced an order of magntiude, i.e., $N'/\beta$, for $j=0$ and, alternatively, denotes a partial remainder selected in a previous partial remainder-representative signal generating step for $j>0$, $q_j$ denotes a quotient digit derived from the transformed numerator, $N'$, for $j=0$ and, alternatively, denotes a quotient digit selected in a prior quotient digit-representative signal generating step for $j>0$, and $D'$ denotes the transformed denominator.

7. The method of claim 1 wherein said quotient digit-representative signal storing step further comprises the steps of
   i. storing the quotient digit-representative signal in a first storage register,
   ii. storing in a second storage register a quotient digit-representative signal, if any, previously stored in said first storage register,
   iii. responding to a signal stored in the first storage register being representative of a negative numerical value for storing in a third storage register a signal representative of the magnitude of the second storage register-stored value, if any, decremented by one, and
   iv. responding to a signal stored in the first storage register being representative of a positive numerical value for storing in a third storage register a signal representative of the magnitude of the second storage register-stored value, if any.

8. The method of claim 1 wherein said quotient digit-representative signal storing step further comprises the steps of:
   i. responding to a signal representative of a numerically positive quotient digit, q, for storing in a first storage register a signal representative of the magnitude the quotient digit and for storing in a second storage register a signal representative of the magnitude of a zero-valued quotient digit, and
   ii. responding to a signal representative of a numerically negative quotient digit, q, for storing in the second storage register a signal representative of the magnitude of the quotient digit and for storing in the first storage register a signal representative of the magnitude of a zero-valued quotient digit; and
   iii. subtracting the contents of the second register from the contents of the first register.

9. An apparatus for radix-$\beta$ numerical division comprising:
   A. means for inputting a signal representative of a numerator, N;
   B. means for inputting a signal representative of a denominator, D;
   C. means for generating a signal representative of a transformation factor, K;
   D. means for generating and storing a signal representative of a transformed denominator, $D'$, being in a range $(\beta-1)/\beta$ to one, and $D'$ being equivalent to a multiplicative product D*K;
   E. means for generating a signal representative of a transformed numerator, $N'$, said transformed numerator-representative signal having a sign portion and a magnitude portion representative of at least one radix-$\beta$ digit;
   F. means for evaluating the sign portion and a single radix-$\beta$ digit-representative portion of said transformed numerator-representative signal for generating and storing a signal representative of a quotient digit, q; and
   G. means for selectively and repeatedly invoking the operation of:
      i. means for generating a signal representative of a partial remainder, P, said partial remainder-representative signal having a sign portion and a magnitude portion representative of at least one radix-$\beta$ digit, and
      ii. means for evaluating said sign portion and a single radix-$\beta$ digit-representative portion of said partial remainder-representative signal for generating and storing a signal representative of a quotient digit, q.

10. The apparatus of claim 9 where by said transformed numerator-representative signal generating means further comprises means for selecting the transformed numerator, $N'$, to be numerically equal to the multiplicative product N*K.

11. The apparatus of claim 9 whereby said transformed numerator-representative signal generating means further comprises means for selecting the transformed numerator, $N'$, to be numerically equal to the numerator, N.

12. The apparatus of claim 9 whereby each said evaluating means further comprises:
   i. means responsive to evaluated portions of said transformed numerator representative signal being representative of a negative value for selecting said quotient digit, q, to be numerically equal to the value represented by said evaluated portions,
   ii. means responsive to evaluated portions of said transformed numerator representative signal being representative of a positive value $(\beta-1)$ for selecting said quotient digit, q, to be numerically equal to the value represented by said evaluated portions, and
   iii. means responsive to evaluated portions of said transformed numerator representative signal being representative of a positive value not equal to a positive value $(\beta-1)$ for selecting said quotient digit, q, to be numerically equal to the value represented by said evaluated portions incremented by one.

13. The apparatus of claim 9 whereby each said evaluating means further comprises:
   i. means responsive to evaluated portions of said transformed numerator representative signal being representative of a negative value not equal to a value $-\beta$ for selecting said quotient digit, q, to be numerically equal to the value represented by said evaluated portions,
   ii. means responsive to evaluated portions of said transformed numerator representative signal being representative of a negative value equal to a value $-\beta$ for selecting said quotient digit, q, to be representative of the value $-(\beta-1)$,
   iii. means responsive to evaluated portions of said transformed numerator representative signal being representative of a positive value $(\beta-1)$ for selecting said quotient digit, q, to be numerically equal to the value represented by said evaluated portions, and
   iv. means responsive to evaluated portions of said transformed numerator representative signal being representative of a positive value not equal to a positive value $(\beta-1)$ for selecting said quotient digit, q, to be numerically equal to the value represented by said evaluated portions incremented by one.

14. The apparatus of claim 9 whereby said partial remainder-representative signal generating means further comprises means for selecting a partial remainder according to the expression $$P_{j+1} = \beta P_j - q_j D'$$

where $P_{j+1}$ denotes a partial remainder being currently selected, $\beta$ denotes the radix of the division, $P_j$ denotes a transformed numerator reduced an order of magnitude, i.e., $N'/\beta$, for $j=0$ and, alternatively, denotes a partial remainder selected in a previous partial remainder-representative signal generating step for $j>0$, $q_j$ denotes a quotient digit derived from the transformed numerator, $N'$, for $j=0$ and, alternatively, denotes a quotient digit selected in a prior quotient digit-representative signal generating step for $j>0$, and $D'$ denotes the transformed denominator.

15. The apparatus of claim 9 whereby said quotient digit-representative signal storing means further comprises:
   i. means for storing the quotient digit-representative signal in a first storage register,
   ii. means for storing in a second storage register a quotient digit-representative signal, if any, previously stored in said first storage register,
   iii. means responsive to a signal stored in the first storage register being representative of a negative numerical value for storing in a third storage register a signal representative of the magnitude of the second storage register-stored value, if any, decremented by one, and
   iv. means responsive to a signal stored in the first storage register being representative of a positive numerical value for storing in a third storage register a signal representative of the magnitude of the second storage register-stored value, if any.

16. The apparatus of claim 9 whereby said quotient digit-representative signal storing means further comprises:
   i. means responsive to a signal representative of a numerically positive quotient digit, q, for storing in a first storage register a signal representative of the magnitude of the quotient digit and for storing in a second storage register a signal representative of the magnitude of a zero-valued quotient digit,
   ii. means responsive to a signal representative of a numerically negative quotient digit, q, for storing in the second storage register a signal representative of the $\beta$-complement magnitude of the quotient digit and for storing in the first storage register a signal representative of the magnitude of a zero-valued quotient digit, and
   iii. means for subtracting the contents of said second register from the contents of said first register.

* * * * *